Jan. 31, 1967 R. R. TRYON 3,301,268
CRUTCHES
Filed May 3, 1965 4 Sheets-Sheet 2
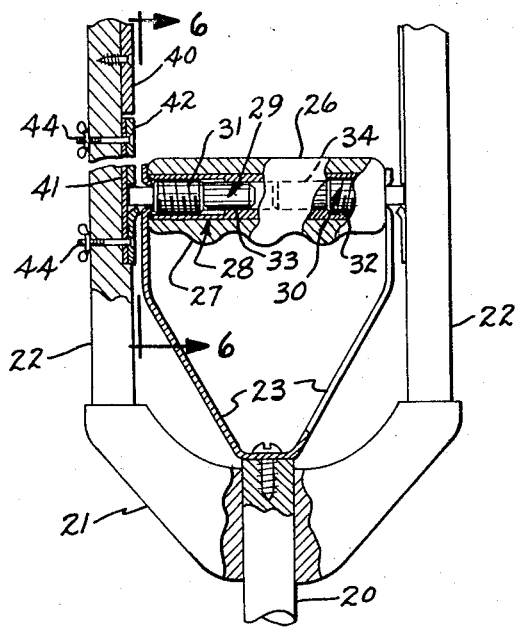
Fig. 5.
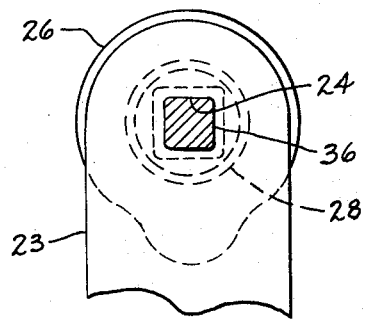
Fig. 6.
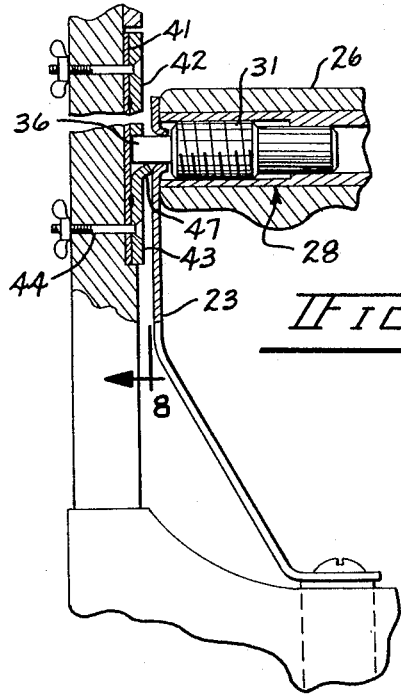
Fig. 7.
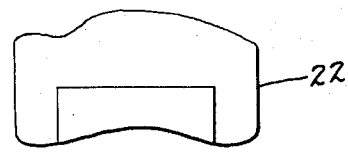
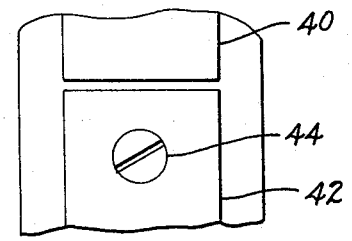
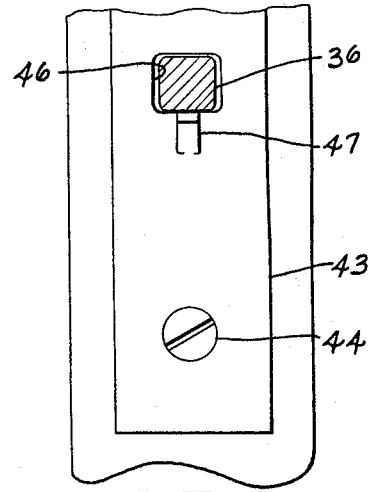
Fig. 8.
INVENTOR.
RICHARD R. TRYON
BY
Marshall, Wilson & Yeasting
ATTORNEYS Jan. 31, 1967    R. R. TRYON    3,301,268
CRUTCHES
Filed May 3, 1965    4 Sheets-Sheet 3

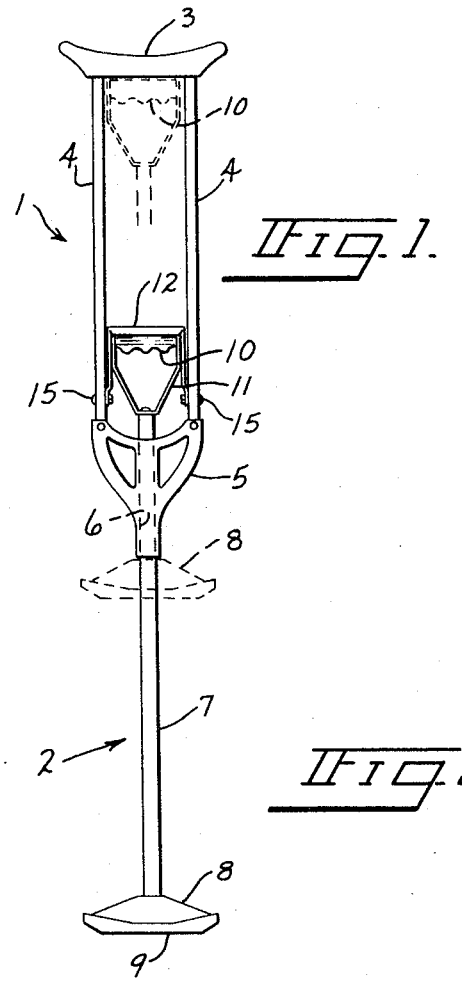
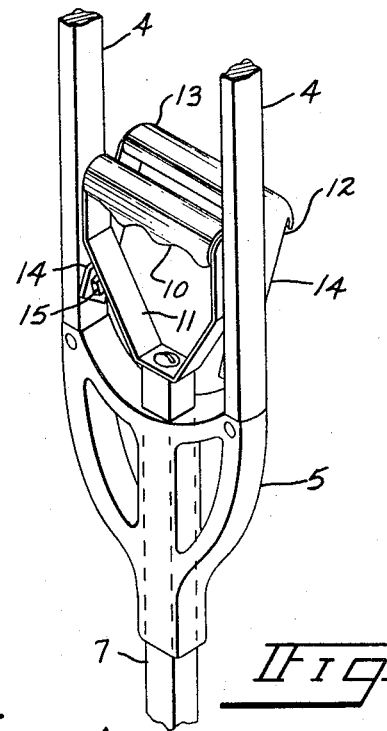
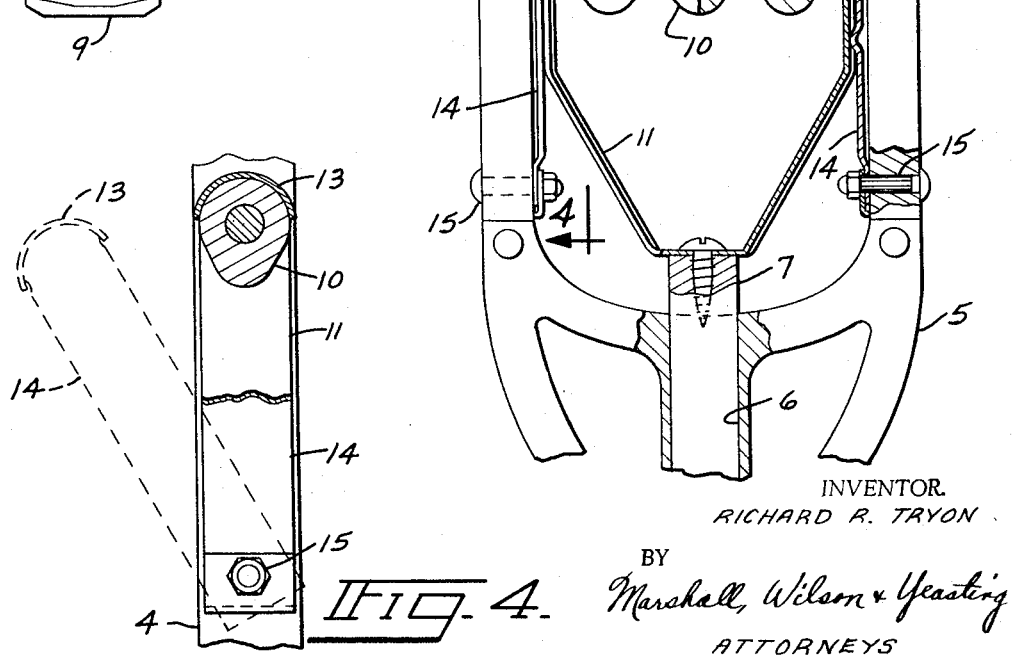

INVENTOR.
RICHARD R. TRYON
BY
Marshall, Wilson & Yeasting
ATTORNEYS

Jan. 31, 1967 R. R. TRYON 3,301,268
CRUTCHES
Filed May 3, 1965 4 Sheets-Sheet 4

INVENTOR.
RICHARD R. TRYON
BY
Marshall, Wilson & Yeasting
ATTORNEYS

United States Patent Office

3,301,268
Patented Jan. 31, 1967

3,301,268
CRUTCHES
Richard R. Tryon, 224 E. Broadway,
Maumee, Ohio 43537
Filed May 3, 1965. Ser. No. 452,694
5 Claims. (Cl. 135—50)

This invention relates to crutches and in particular to improvements contributing to the convenience and safety of the user and to a considerable reduction of the user's energy expenditure required for the use of this invention as compared to the use of conventional crutches.

Crutches used as an aid to walking customarily comprise a light-weight frame having an upper arm-pit rest adapted to support the user's weight chiefly at that point, a handle at arm's length from the arm-pit rest, and a lower section which becomes a single vertical shaft terminating as a small area of ground contact with that area being of approximately the same shape and same size as the cross-section of the shaft, and sometimes having a metal or rubber cap to cover the same small area of ground contact but with such cap also having approximately the same shape and same size as the cross-section of the shaft.

Such conventional crutches, because of their overall length, are awkward to store when not in use. Also, when conventional crutches include a conventional endcap of rubber, the small area of such a cap combined with the fact that the under surface of the cap is or becomes approximately hemispherically rounded makes the conventional crutch hazardous to use on slippery surfaces, soft ground, and on sidewalk gratings. In addition, a conventional crutch requires its user to expend an undesirable excess of energy not only in giving himself a horizontal thrust but also to lift his weight vertically from the height which marks the beginning of a step to the height that the user must attain when the crutch reaches a vertical position at the middle of a step.

Various proposals have been made to construct crutches in a telescopic form or to be folded to reduce their length for temporary storage. Such proposals have not been commercially acceptable to potential users for one or more of several reasons. In some cases it was plainly evident that the designs offered could not function properly after they had been exposed to hard usage. In other cases the relative safety of locking mechanisms was achieved only at the expense of objectionable awkwardness or complexity. Finally, non of these proposals provide a natural and automatic means whereby the user, by the sense of touch in his hands in contact with the handgrip of the crutch preparatory to and during use, is conclusively assured that the crutch was safely locked in its working position.

One of the principal objects of this invention is to provide a telescoping crutch in which locking means are incorporated in the handgrip of the crutch so that the user is at all times advised by sense of touch in his hand contact with the handgrip whether the crutch is securely locked in its extended position or is unlocked for ready telescoping to a shorter length. A related object of this invention is to provide a simple, positive lock for a telescoping crutch.

Another object of this invention is to provide an extended under surface for the lower extremity of the crutch, comprised of a foot, with or without an attached overshoe, shaped so that the point of contact between the foot, or the overshoe, and the ground shifts forward along the extended under surface as the user swings forward on the crutch, and so that the total area of the under surface will be as large as is conveniently possible, thereby increasing the safety when the crutch is used on soft ground, on slippery surfaces, or on sidewalk gratings, and so that the amount of energy the user must expend to thrust himself forward horizontally and to lift himself vertically is considerably less than is required when using a conventional crutch.

These and more specific objects and advantages are apparent from the following description of a preferred form of the improved crutch and of sundry optional variables that may be incorporated in its design.

According to the invention the improved crutch includes any of three styles of locking mechanism incorporated into the handle portion of the crutch and each is arranged so that the handle portion has a different shape or change of position that is readily identifiable by sense of touch in the user's hands, as well as visually, when the crutch is locked in extended position or when the locking mechanism is unlocked.

This invention also includes the provision of an elongated convex foot extending forward and backward from its point of connection with the leg of the crutch, considering the forward and backward directions as being in the direction of motion of the user of the crutch. The larger area of the under surface of the foot provides a greater safety for the user when the crutch is used on soft ground, on slippery surfaces, or on sidewalk gratings as compared to that of a conventional crutch. Because of the elongated convex shape of the foot the point of contact between the foot and the ground shifts forward as the user swings himself forward in walking.

The improved crutch may also include an overshoe of elastomeric material such as rubber, shaped for convenient and sure attachment to the foot, to augment the advantages that the foot alone possesses.

Preferred forms of the invention are illustrated in the accompanying drawings.

In the drawings:

FIGURE 1 is a side elevation of the improved crutch showing what is hereinafter called the "Style A" locking mechanism.

FIGURE 2 is an enlarged fragmentary perspective view of the Style A locking mechanism for holding the crutch in an extended position and for releasing the crutch for telescoping to a shortened position.

FIGURE 3 is an enlarged side elevation, with parts broken away and parts shown in section, of the Style A locking mechanism shown in FIGURE 2.

FIGURE 4 is a vertical section taken substantially along the line 4—4 of FIGURE 3.

FIGURE 5 is an enlarged fragmentary side elevation, partly in section and with parts broken away, showing a "Style B" locking mechanism for releasably holding the crutch in extended position.

FIGURE 6 is a fragmentary end elevation of the handle portion of the Style B locking mechanism as seen from the line 6—6 of FIGURE 5.

FIGURE 7 is a fragmentary side elevation with parts shown in section of an improved latch plate and cooperating lock parts for use in conjunction with the Style B locking mechanism.

FIGURE 8 is a front elevation of the latch plate shown in FIGURE 7.

Figure 9:
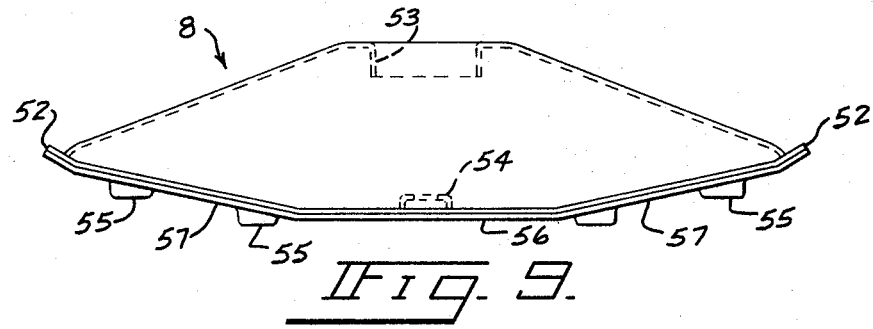
FIGURE 9 is a side elevation of a preferred form of foot for the improved crutch.

These specific figures and the accompanying description are intended merely to illustrate the invention and not to impose limitations on its scope.

An improved crutch constructed according to the invention comprises an upper portion 1 that telescopically receives a lower portion 2. It should be understood that both portions can be manufactured in varying lengths as a primary control of the maximum and minimum length of the crutch whether in extended or retracted position. In addition, this invention includes provisions for supplementary adjustments of length to match the height of the user, apart from the extensions or retractions accomplished by the telescoping action.

In an improved crutch constructed according to the invention the upper portion comprises an arm pit rest 3 mounted on the upper ends of a pair of spaced parallel side members 4 that are connected at their lower ends to a connector bridge 5 to form a generally rectangular framework. The connector bridge 5, preferably an aluminum alloy or reinforced plastic casting has sockets to receive the lower ends of the side members 4 and has a central channel 6 shaped to receive, support, and slidably retain a staff 7. The channel extends along a downward extension of a line parallel to and approximately midway between the side members 4.

The lower portion 2 of the improved crutch comprises the staff 7 having a cross-section shaped to slidably fit the cross-sectional shape of the channel 6. Ordinarily the cross-section of the channel and staff should be non-circular to prevent any relative rotation of the parts, but the invention can permit the use of round cross-sections for the staff 7 and the channel 6 provided other components are supplied to prevent rotation of the staff relative to the channel.

The lower end of the staff 7 is firmly attached to a foot 8 and may be used with such a foot without an overshoe, but it is preferred to use an overshoe 9 to augment the advantages provided by the foot, and protuberances on the undersurfaces of both the foot and the overshoe supply an anti-skid pattern.

When this invention makes use of a Style A locking mechanism as shown in FIGURES 1, 2, 3 and 4, the upper end of the staff 7 is non-rotatably connected to a handle portion 10 by means of side brackets 11, the assembly of the handle, brackets, and staff being restrained from twisting preferably by the fit of the staff within the channel 6 so that the handle 10 remains continuously in the plane of the side members 4.

The Style A locking mechanism further includes a second handle portion 12 comprising a hollow shell 13 connected through legs 14 and bolts or rivets 15 to the side members 4 so that the handle portion 12 may be pivoted into or out of the plane of the side members 4 in response to manipulation by the user. The handle 12 has a concave undersurface which fits the convex upper surfaces of the cross-piece or handle portion 10 whenever the user causes them to be pushed together to lock the handle pieces 10 and 12 to hold the crutch in its extended condition.

When the improved crutch is thus in locked position the user can unlock the mechanism by pushing the upper and lower sections of the crutch in opposite directions the short distance needed to separate handle 12 from handle portion 10; then by pivoting the handle 12 out of the plane of the side members 4, the user can telescope the crutch to a shortened length. When the improved crutch has been telescoped to a shortened length, the user can restore it to be extended and locked position by pushing the upper and lower sections in opposite directions until the position of the handle portion 10 permits the handle 12 to be pivoted back into the plane of the side members 4, then pushing the upper and lower sections together until the upper surface of handle portion 10 fits into and engages the under surface of hollow handle 12.

Thus with or without additional coverings on the surfaces of handle portions 10 and 12 that touch the user's hand, the portions jointly comprise a composite handgrip when the crutch is in its extended and locked position.

When the crutch is in locked and extended position and is in use, the force from the user's weight is transferred from the armpit rest 3 downwardly through the side members 4, thence upwardly through the legs 14 to the handle 12, thence downwardly onto the handle portion 10, through the brackets 11, and finally through the staff 7 to the ground. Thus the user's own weight presses the handle portions 10 and 12 together at all times that the user's weight rests upon the crutch. Correspondingly the user's grip on the two handle portions keeps them together whenever the user lifts the crutch from a ground contact.

Although FIGURES 1, 2, 3 and 4 show the legs 14 fastened to the side members 4 at a point below the level of the handle portion 10, this invention allows the alternative of fastening the legs 14 to the side members 4 at a point above the level of the handle portion 10 provided the under surface of handle 12 retains a concave under surface to fit over the convex upper surface of handle portion 10.

Regardless whether the legs 14 point upward or downward, this invention provides for supplementary adjustments of the extended length by supplying additional pairs of holes in the side members 4 so that the legs 14 may be bolted or riveted into those holes at the user's choice of levels.

It will be noted that a crutch including the Style A locking mechanism requires no latch plates or guide channels on the inside surfaces of its side members 4 when, as provided, the cross-sections of the shaft 7 and the channel 6 are non-circular. However, as compared to a crutch equipped with a Style B or Style C locking mechanism, a crutch equipped with the Style A mechanism has a disadvantage in that the cross-piece 12 must be deflected out of the plane of the upper portion 1 to allow the crutch to be telescoped to its closed position and this leaves the cross-piece in an inconvenient position for storage.

The Style B locking mechanism together with its recommended latch is illustrated in FIGURES 5, 6, 7 and 8. When the improved crutch includes a Style B locking mechanism a staff 20 preferably has a non-circular cross-section to match a corresponding non-circular cross-section of the vertical channel extending through a connector bridge 21, whereby the staff is held firmly but slidably, yet cannot twist out of the plane of upper side rails or members 22. Arms 23, non-rotatably attached to the upper end of the staff 20 extend upwardly while diverging until their upper portions are close and parallel to the side members 22. The upper ends of the arms 23 have rectangular apertures 24, with or without supplementary bearing surfaces along one or more of the edges of the apertures.

A handgrip 26 has a circular cross-section except for projecting knobs 27 or a projecting ridge forming a position index, and these knobs or ridge are aligned so that they face downward when the mechanism is in a locked position. The handgrip includes a tubular core 28 that is internally threaded equal distances from each end toward the center, the threads in one end being of one hand and the threads at the other end being of the other hand.

Locking bolts 29 and 30 are threaded on enlarged central sections 31, 32 one right and the other left to match the threading of the core 28 and are of a length that causes their inner ends 33, 34 to abut when they are threaded equal distances into the core from its opposite ends, while the other ends of the bolts continue to project slightly beyond the opposite ends of the core.

The outer end of each locking bolt has a rectangular cross-section forming a tenon 36 that fits through the rectangular aperture 24 in the arm 23, so that bolts, core, and handgrip are held between the upper ends of the arm 23, while the rectangular fit of the tenons inside the apertures 24 prevents the bolts from rotating when the handgrip is turned.

As the handgrip is twisted in one direction at the desire of the crutch user, the locking bolts 29 and 30 are retracted into the core 28 until the inner ends of the bolts abut each other. As the handgrip is twisted in the opposite direction the bolts are thrust outward from the core ends until the rectangular ends of the bolts enter either into corresponding openings or slots in the side-members 22 or preferably into apertures or slots in latch plates 40 as illustrated in FIGURE 7, such a latch plate being attached to the inner surface of each of the side-members 22.

When the bolt ends rest inside the slots of the side-members 22 or of the latch plates 40 attached to the side-members the effect is to lock the crutch in extended position. When the user chooses to telescope the crutch from locked-extended to unlocked-contracted position, he twists the handgrip so that the bolt ends are withdrawn from the slots and then pushes the upper and lower sections of the crutch to a contracted position. When the user chooses to telescope the crutch from an unlocked-contracted position to the locked-extended position, he pushes the opposite ends of the crutch apart until each bolt end 36 bumps against a projecting lip 47 at the under edge of the slot that has been provided in each side-member or latch plate attached to such side-member. That contact prevents further separation of the upper and lower sections of the crutch and at the same time informs the user that the bolt ends are in position to permit them to be extended into their respective slots by turning the handgrip.

Retraction of the bolts is stopped when their inner ends abut. Extension of the bolts is stopped when their outer ends encounter the bottom surface of the slot in the side-member or the end surface of the slot provided in the latch plate attached to the side-member.

The length dimensions of the bolts and the core are such that at the point of maximum retraction of the bolts the outer ends of the bolts are free from the slots of side members or from the slots of latch plates, if latch plates are used, but still leave portions of the outer end areas of the bolts retained within the apertures of the arms 23.

It is further provided that the pitch of the threads of the bolts 29 and 30 and of the tubular core 28 shall be such that the distance moved by each bolt between the point of maximum extension and maximum retraction shall be accomplished by approximately three-quarters turn of handgrip and core. It is additionally provided that the locking mechanism shall be so assembled that the knobs or ridge along the handgrip are facing downward when the point of maximum bolt-extension has been reached, that position of the knobs or ridge thereby signifying to the crutch user, by the sense of touch of his hands in contact with the handgrips, that the crutch is securely locked in extended position. It should be noted that, according to this invention, the accomplishing of maximum retraction of the bolts by less than one full turn of the handgrip prevents the handgrip from ever having its knobs or ridge pointing downward except when the bolts are fully extended, and that the bolts are prevented from ever being fully extended except when they are aligned with the slots in side-members or in latches attached to side-members.

While the locking mechanism incorporated within the design and assembly of arms 23, core 25, bolts 29 and 30, and handgrip 26, could be used in conjunction with slots in side members without special latches or could be used with latches other than of the styles illustrated in FIGURES 5, 7 and 8, the latch design as shown in these figures is specifically included as an optional portion of this invention.

Optionally, the latch may include a suplementary plate 40, a back-up plate 41, an upper front plate 42 attached to the upper end of the side that is to face toward the bolt end 36, and a lower front plate 43 attached by bolts 44 to the lower end of the side 22 that is to face toward the bolt end 36. The lower end of upper plate 42 is separated from the upper edge of the lower plate 43 a distance corresponding to the thickness of the bolt end 36. The upper edge of lower plate 43 has a lip extension 47 to prevent passage of the bolt end 36. If desired, plates 42 and 43 can be combined as a single plate, as illustrated in FIGURE 8, having a rectangular slot 46 cut through it as an aperture to receive the bolt end 36, and with a lip 47 at the lower edge of the aperture to prevent further passage of the bolt-end in the process of telescoping the crutch to the position at which the crutch can be locked. In either case, the back-up plate 41 limits the movement of the bolt end 36 when the handgrip is turned to push the bolt end into the aperture or slot.

The foot 8, which may be used with any type of walking crutch, may be formed of any material of suitable characteristics to bear the loads and stresses, and may be formed either as a single piece or of components joined together as by bolting, riveting, or welding. The foot may have external brackets or provisions for separate brackets to be attached externally so that the brackets form all or part of an external connection between the foot and the staff. The preferred means of connection comprises an opening 53 at the top of the foot through which the staff extends until it reaches or closely approaches the base of the foot. Such a shaft opening 53 may either have continuous side walls or it may consist only of a top edge with or without a collar, cooperating with a socket at the bottom of the foot to receive the lower end of the staff, or a protuberance 54 at the same level to fit into a recess at the lower end of the staff. The cross sections of the shaft and the related portion of the foot are shaped and dimensioned to cause a tight fit between them, and a bolt or rivet extending laterally through the side walls of the shoe and the staff assures that the shaft can neither be pulled out of the foot nor rotated within the foot.

The lower surface of the foot comprises a solid area sole 57. If the foot is intended to receive a covering overshoe the sole area is slightly longer and preferably slightly wider than the upper portion of the foot to form a marginal lip 52 that fits into a corresponding recess of an overshoe 60. Such an overshoe comprises a molding of rubber or similar material adapted to fit over the foot 8 with an inwardly directed lip 61 fitting over the marginal lip 52.

Figure 11:
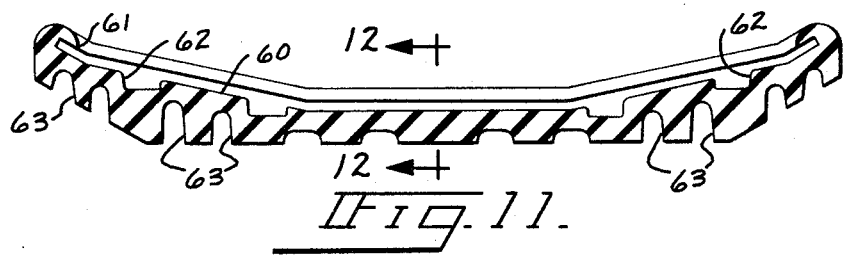
FIGURE 11 is a longitudinal vertical section of an overshoe to fit on the foot shown in FIGURES 9 and 10.
Figure 12:
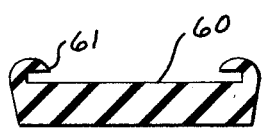
FIGURE 12 is a transverse vertical section of the improved overshoe as seen from the line 12—12 of FIGURE 11.
Figure 13:
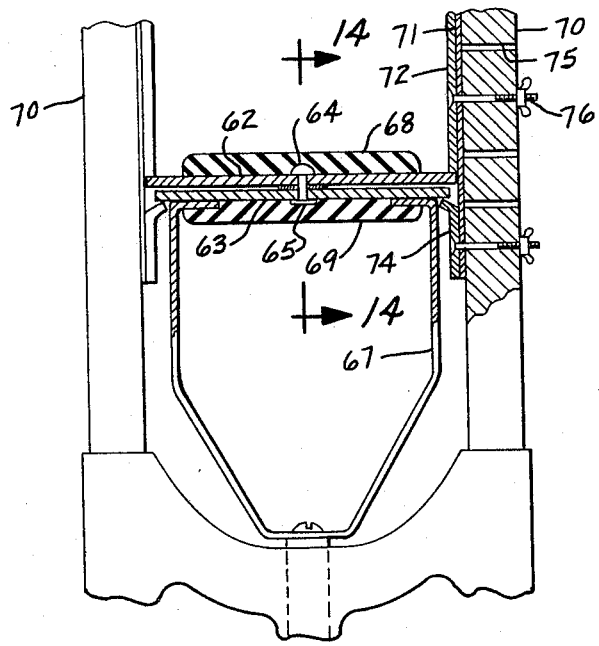
FIGURE 13 is a side elevation, with parts broken away and parts shown in section, of the handle portion showing a "Style C" locking mechanism.
Figure 14:
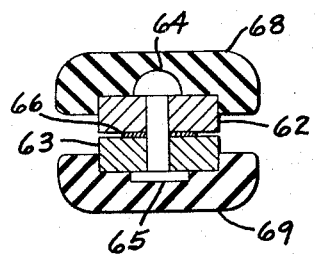
FIGURE 14 is a cross-section of the handle portion of the locking mechanism as seen from the line 14—14 of FIGURE 13.
Figure 15:
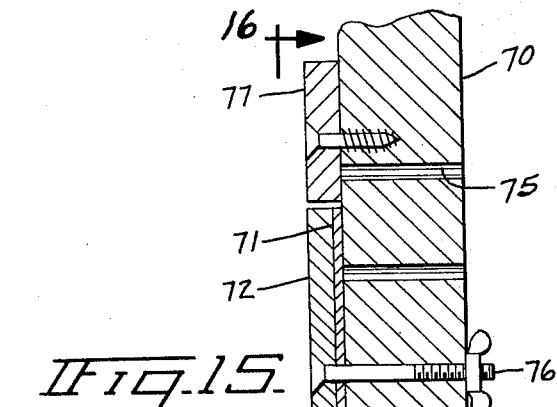
FIGURE 15 is a vertical section of an improved latch plate for use with the Style C locking mechanism.

The under surface of the sole has protuberances 55 or recesses so that this surface exhibits an anti-skid pattern whether it is used with or without an overshoe, but it is especially intended that these protruberances or recesses of the sole shall fit corresponding protuberances or recesses 62 in the upper surface of the sole of the overshoe 60 as shown in FIGURE 11 to reduce the distances in which an elastic material of the overshoe can be stretched while in use, thereby constituting a supplementary safeguard against any risk of the overshoe coming loose from the foot while the crutch is in use.

Figure 10:
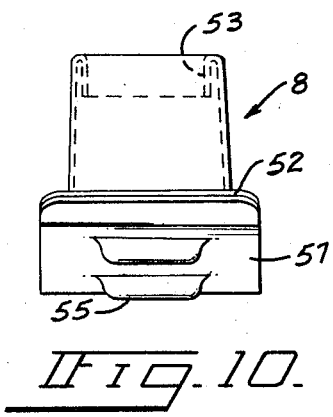
FIGURE 10 is an end elevation of the preferred form of foot.

This improved crutch provides that the width of the shoe and overshoe shall be whatever can be conveniently used, bearing in mind the need that the width shall not be so great as to be likely to cause the shoe or overshoe to bump against the user's feet or legs. Thus the width may be about two inches and the shoe will have an end elevation as shown in FIGURE 10.

Preferably the length of the shoe and overshoe, measured in the same direction as the forward-backward steps of the user, should be as great as possible within the limitations of convenience and esthetics, and should therefore be about 7½ inches.

As seen in side elevation, the sole of the shoe and overshoe can be basically flat, basically slightly convex toward the ground, or as in FIGURE 9 can be angled upward at its opposite ends from a slightly convex or flat center section. The latter shape is preferred.

There is an additional advantage in providing for the under surface of the overshoe to be angled upward at its opposite ends as illustrated in FIGURE 11, instead of having that surface convex or flat. This advantage comes from the fact that such an overshoe when the crutch is extended forward presents initially a larger area of ground contact than would otherwise be the case, and is accordingly less likely to slip. Also there is similar safety factor provided by the larger area of ground contact when the crutch extends rearward at the completion of a step. Such advantage is enhanced by the fact that the larger area available in the angled surfaces permits the area to be cleated as illustrated in FIGURE 11.

If the foot were to be used without an overshoe it would be preferable for its undersurface to be angled the same as shown for the overshoe as in FIGURE 11 rather than is shown for the shoe in FIGURE 9. However, this invention makes provision for the angle of the foot to be different from that of the lower surface of the overshoe so that the most desirable angle can be given to the undersurface of the ends of the overshoe at the same time that the different angle of the ends of the foot permits, as provided, the further advantage of making the tread of the overshoe especially thick in the end areas at the points of maximum wear.

A third form of locking mechanism, known as Style C is illustrated in FIGURES 13-16. As shown in these figures the Style C locking mechanism comprises upper and lower handle crosspieces 62, 63 that are pivotally connected at their midpoints by a rivet 64 set into a spring washer 65 to provide resilient tension in the connection. The crosspieces 62, 63 may be separated by a thin friction washer 66 located on the rivet 64 provided sufficient friction exists to prevent easy rotation of the upper crosspiece 62.

The lower crosspiece 63, at its ends, is connected to legs 67 attached to and extending upwardly from the upper end of the lower part of the crutch.

Plastic or rubber handgrips 68, 69 are firmly attached to the handle crosspieces. These may be molded to conform to a person's hand or left smooth as shown.

Figure 16:
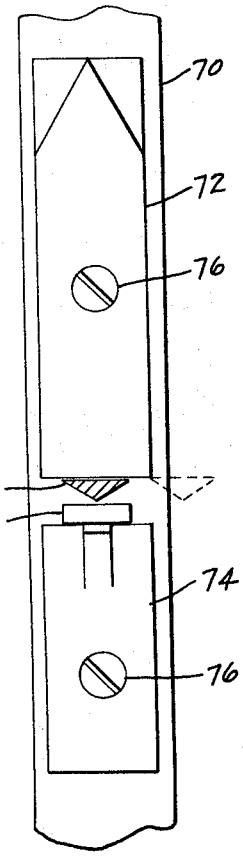
FIGURE 16 is a front elevation of the improved latch as seen from the line 16—16 of FIGURE 15.

Side rails 70 of the upper portion of the crutch are each fitted with a backing strip 71, a latch strip 72, and a lower stop 74. The side rails each have a series of drilled holes 75 to receive bolts 76 holding the backing strip together with the latch strip 72 and the stop 74 in place. The series of holes permit the length of the crutch to be easily varied as may be required. Each stop 74 has a protruding lip extending into the path of an end of the lower crosspiece 63 to limit the extension of the lower crutch member relative to the upper crutch member. The ends of the upper, movable crosspiece 62 are beveled upwardly toward each side of the crosspiece leaving a flat upper surface extending the full width of the crosspiece as may be seen in FIGURE 16. The upper end of the latch strip 72 may be beveled as indicated in FIGURE 16 or left square. If it is left square a filler strip 77 may be used as a continuation.

In this arrangement the crutch is unlocked by turning the upper handgrip 68 and its crosspiece 62 to disengage the crosspiece end from the lower end of the latch strip 72. The crutch may then be collasped to its closed form. In the closed form the handle 68 may be returned to alignment with the side rails 70, the ends being above the filler strips 77.

When the crutch is returned to extended position, the ends of the upper handle crosspiece 62 are moved sidewise enough to clear the filler strip 77 and the latch strip 72 either by the user or by being cammed to the side as the beveled tips of the crosspiece 62 engage the pointed upper end of the latch strip when no filler strip 77 is used. When the crutch is fully extended the crosspiece 63 engages the stop 74 and the ends of the crosspiece 62 are moved under the latch strip 72 to lock the crutch in its extended position. As in the other latch mechanisms, the position of the cooperating members is readily ascertained by the position of the handle members so the user is constantly aware of the locked or unlocked position of the handle assembly.

A crutch constructed according to the invention thus provides one or more of the following advantages: The convenience of being either shortened for storage or extended for use; an easy means to lock or unlock the crutch by any of three styles of locking mechanisms; greater safety and greater confidence in safety when the crutch is locked in extended position as a consequence of the user's sense of touch in the contact of his hand with the handgrip component of the locking mechanism; a conservation of the user's energy in his lateral thrust; a conservation of this energy in his vertical lift; increased safety resulting from a larger ground-contact area of foot or overshoe; increased safety resulting from the angled ends of foot or overshoe; increased wearing-life of the overshoe resulting from the means provided to thicken the tread of the ends; and a combination of safety and convenience for attaching the original or replacement overshoes to the feet, and for making such attachment secure.

Having described the invention, I claim:

1. A telescoping crutch comprising, in combination, an upper portion including a pair of spaced parallel side rails having their upper ends connected by an arm rest, and a lower portion which is slidably connected to the upper portion and which includes a staff, and a handgrip by which the user holds on to the crutch and which is connected to said lower portion and is located between the parallel rails, at least a portion of the handgrip being mounted to pivot through less than a complete revolution, between a normal position and an abnormal position and being unsymmetrical with respect to the axis of pivoting to permit the user to tell by his sense of touch whether it is in its normal or its abnormal position, and a latch mechanism positively driven by the pivotable portion of the handgrip and engageable with at least one rail for latching the handgrip in a predetermined fixed position between the parallel rails when such portion of the handgrip is in its normal position and thereby locking the upper and lower portions of the crutch positively in their extended positions, the upper and lower portions of the crutch being free to slide relative to one another when such portion of the handgrip is in its abnormal position.

2. In a telescoping crutch according to claim 1, a handle comprising an internally threaded tubular member that is rotatable about its axis, a pair of oppositely threaded bolts threaded into the tubular member for axial movement therein, means on the staff engaging the bolts to hold said tubular member relative to the staff, and latch means on the side rails cooperating with the bolts when said bolts are extended by rotation of the tubular member to lock the crutch in extended position, said bolts being moved from retracted to extended position by a fractional revolution of said tubular member, and a handgrip including a position index fixedly attached to and enclosing said tubular member.

3. In a telescoping crutch according to claim 2, stop means on the side rails engaging the bolts when the crutch is extended to its maximum length and the bolts are aligned with the cooperating latch means.

4. In a telescoping crutch according to claim 1, a first handle portion that is rigidly fixed to the upper end of the staff, a second handle portion pivotally attached to the first portion for rotation about an axis parallel to the length of the crutch, a latch plate and stop means mounted on the side rails, said first handle portion being adapted to engage said stop means to limit extension of the crutch, and said second handle portion being adapted to engage the lower end of the latch plate when the crutch is extended and the handle portions are parallel to each other.

5. A telescoping crutch according to claim 4 in which the lower surface of the second handle member is beveled adjacent to each end and the upper end of the latch plate has a sharp upper end whereby the handle member is cammed laterally as the crutch is extended.

References Cited by the Examiner
UNITED STATES PATENTS

| | | | |
|---|---|---|---|
| 267,680 | 11/1882 | Crandall | 135—49 |
| 705,741 | 7/1902 | Drew | 135—50 |
| 1,254,061 | 1/1918 | Mueller | 135—61 |
| 1,501,580 | 7/1924 | Beam | 135—50 |
| 2,172,047 | 9/1939 | Jacobucci | 135—50 |
| 2,507,880 | 5/1950 | Bell | 182—108 X |
| 2,666,608 | 1/1954 | Holm | 182—108 X |

HARRISON R. MOSELEY, *Primary Examiner.*

P. M. CAUN, *Examiner.*